US005261026A

United States Patent [19]

Tomaru et al.

[11] Patent Number: 5,261,026

[45] Date of Patent: Nov. 9, 1993

[54] CONTROLLING APPARATUS FOR BALANCED CARGO OR WORK HANDLING SYSTEM

[75] Inventors: Hitoshi Tomaru; Shuu Takeda; Seiji Kamata, all of Kanagawa, Japan

[73] Assignee: Kabushiki Kaisha Komatsu Seisakusho, Japan

[21] Appl. No.: 820,855

[22] PCT Filed: May 22, 1990

[86] PCT No.: PCT/JP90/00654

§ 371 Date: Feb. 6, 1992

§ 102(e) Date: Feb. 6, 1992

[87] PCT Pub. No.: WO91/17945

PCT Pub. Date: Nov. 28, 1991

[51] Int. Cl.$^5$ ..... H02P 1/04

[52] U.S. Cl. ..... 388/847; 388/930; 318/651

[58] Field of Search ..... 388/842-847, 388/902, 907.5, 930; 318/696, 611, 632, 649, 651

[56] References Cited

U.S. PATENT DOCUMENTS

| | | | |
|---|---|---|---|
| 4,520,906 | 6/1985 | Watanabe | 318/765 X |
| 4,554,999 | 11/1985 | Kamaike | 318/376 X |
| 4,580,084 | 4/1986 | Takahashi et al. | 388/844 |
| 4,651,073 | 3/1987 | Shimizu et al. | 318/611 X |
| 4,803,409 | 2/1989 | Horikawa | 318/649 X |
| 4,808,895 | 2/1989 | Fujita et al. | 318/276 X |

OTHER PUBLICATIONS

Patent Abstracts of Japan, vol. 014, No. 196 (M-0964) Apr. 20, 1990 and JP-A-2 038 297 (Komatsu) Feb. 7, 1990.

Patent Abstracts of Japan, vol. 014, No. 384 (M-1013 Aug. 20, 1990 and JP-A-2 144 400 (Komatsu) Jun. 4, 1990.

*Primary Examiner*—William M. Shoop, Jr.
*Assistant Examiner*—D. Martin
*Attorney, Agent, or Firm*—Ronald P. Kananen

[57] ABSTRACT

A controlling apparatus for use in a balanced work or cargo handling system which aims at detecting the weight of the work or cargo suspended accurately even if a drift occurs in an acceleration detector due to changes in ambient temperature to thereby enable a stable work or cargo raising and lowering operation to be achieved. The controlling apparatus comprises an acceleration correcting arithmetic unit (23) adapted to output the difference between an averaged acceleration signal (Vaφ) obtained by averaging the drifted acceleration signals (Va) transmitted by an acceleration; detector (8) during a predetermined period of time and the drifted acceleration signal (Va), as a corrected acceleration signal (Va') to a command arithmetic unit (17) and a load storage and arithmetic unit (22) when the absolute value (|Va|) of the drifted speed signal (Va) is less than a preset value (εa) and the absolute value (|V|) of the speed signal (V) from speed detector (3) is less than a preset value (εv) during the predetermined period of time.

3 Claims, 2 Drawing Sheets

CONTROLLING APPARATUS FOR BALANCED CARGO OR WORK HANDLING SYSTEM

TECHNICAL FIELD OF THE INVENTION

This invention relates to a controlling apparatus for use in a balanced work or cargo handling system adapted to create a balanced condition between a work or cargo suspended by a driver means and a work lifting means of a work handling system by generating a force corresponding to the load or weight of the work in the driver means so that the work can be raised or lowered freely by an operator by applying a weak manual force by his, and more particularly to a controlling apparatus for use in a balanced work or cargo handling system adapted to accurately detect the weight of a work even when a drift occurs in an acceleration detector due to changes in ambient temperature etc., and therefore enable stable work raising and lowering operations to be achieved.

BACKGROUND ART OF THE INVENTION

The prior art methods and apparatuses for controlling balanced cargo or work handling systems of the kind specified above are disclosed in the publications of Japanese Laid-Open Patent Application Nos. SHO 63-196495, SHO 63-315497, HEI 1-127600 and HEI 1-133900 filed by the applicant (assignee) of the present invention.

However, the prior art controlling apparatuses for use in balanced cargo or work handling systems disclosed in the above-mentioned applications are not provided with an arithmetic unit adapted to correct fluctuations in the acceleration detection signal sent out by an acceleration detector unit.

These prior art controlling apparatuses for use in balanced cargo or work handling system have been disadvantageous in that it cannot detect the load or weight of a work or cargo accurately in case a drift occurs in the acceleration detector due to changes in the ambient temperature, etc, and also in case a negative feedback of the acceleration is made during raising and lowering of the work or cargo, the above-mentioned drift renders it impossible to conduct a stable cargo or work handling operation.

SUMMARY OF THE INVENTION

The present invention has been made in view of the above-mentioned circumstances in the prior art, and has for its object to provide a controlling apparatus for use in a balanced work or cargo handling system, which is capable of detecting the load or weight of a work even when a drift occurs in an acceleration detector due to changes in the ambient temperature, etc, and cancelling the influence of the drift even in case of negative acceleration signal feedback during the raising or lowering of the work, to thereby enable stable work raising/lowering operation to be achieved.

To achieve the above-mentioned object, according to a first aspect of the present invention, there is provided a controlling apparatus for use in a balanced work handling system, comprising: a work lifting means for raising and lowering a work suspended thereby; a driver means for driving the work lifting means; a speed detector means for detecting the rotational speed of the driver means; a position detector means for detecting the position of the work lifting means; a load detector means for detecting the loading applied to the work; a speed command instructing means for outputting a speed command signal in response to the amount of manipulation of an operating lever by an operator; an acceleration detector means for detecting the acceleration exerted on the work; a weight storage and arithmetic means for storing and computing the weight of the work in accordance with a signal transmitted by the load detector means; a command arithmetic unit for computing a command signal to be outputted to the driver means in accordance with an output signal transmitted by each of the above means, and an acceleration correcting arithmetic means adapted to output the difference between an averaged signal obtained by averaging the drifted acceleration signals transmitted by the acceleration detector means during a predetermined period of time and the drifted acceleration signal as a corrected acceleration signal to the command arithmetic unit and the weight storage and arithmetic means, respectively, when the absolute values of the drifted acceleration signal from the acceleration detector means and the drifted speed signal from the speed detector means are less than respective preset values during the predetermined period of time.

Further, according to a second aspect of the present invention, there is provided a controlling apparatus for use in a balanced work handling system as set forth in the above-mentioned first aspect, wherein the acceleration correcting arithmetic means comprises two absolute value comparator circuits adapted to receive as inputs thereof a speed signal transmitted by the speed detector means and an acceleration signal transmitted by the acceleration detector means and compare the speed signal and the acceleration signal with their respective preset values; an AND circuit adapted to receive as inputs thereof the output signals from these absolute value comparator circuits; an averaging circuit adapted to receive as inputs thereof the output signal from the AND circuit through the starting and resetting input terminals thereof, and also the acceleration signal; a latch circuit adapted to receive as input thereof the output signal from the averaging circuit and latch the signal; a switch provided in a line connecting the latch circuit and the averaging circuit; a timer adapted to receive as input thereof the output signal from the AND circuit through the starting and resetting input terminals thereof and output ON/OFF actuating signal from the switch; and an adder adapted to compute the difference between the output signal from the latch circuit and the acceleration signal and output it as a corrected acceleration signal to the command arithmetic unit and the weight storage and arithmetic means, respectively.

According to the present invention incorporating the above-mentioned aspects, an actuator is driven by a command value which is computed by the command arithmetic unit on the basis of the speed signal from the speed detector, the load signal from the load detector, the weight command signal from the weight storage and arithmetic unit, etc. At that time, the acceleration correcting arithmetic unit will output the difference between an averaged acceleration signal obtained by averaging the drifted acceleration signals during a predetermined period of time and the drifted acceleration signal as a corrected acceleration signal to the command arithmetic unit and the load or weight storage and arithmetic unit, respectively, in case the absolute values of the drifted acceleration signal and the drifted speed signal are less than their respective preset values during the predetermined period of time. As a result, the output signal from the load storage and arithmetic unit and the command signal from the command arithmetic unit are corrected.

Accordingly, even in case a drift occurs in the acceleration detector due to changes in the ambient temperature, the weight of the work can be detected accurately, and also even in case a negative feedback of the acceleration signal is made during the raising and lowering of the work, the effect of the drift can be cancelled to enable a stable work raising and lowering operation to be achieved.

DETAILED DESCRIPTION OF PREFERRED EMBODIMENT

The present invention will be described in detail below by way of an example with reference to the accompanying drawings.

Figure 2:
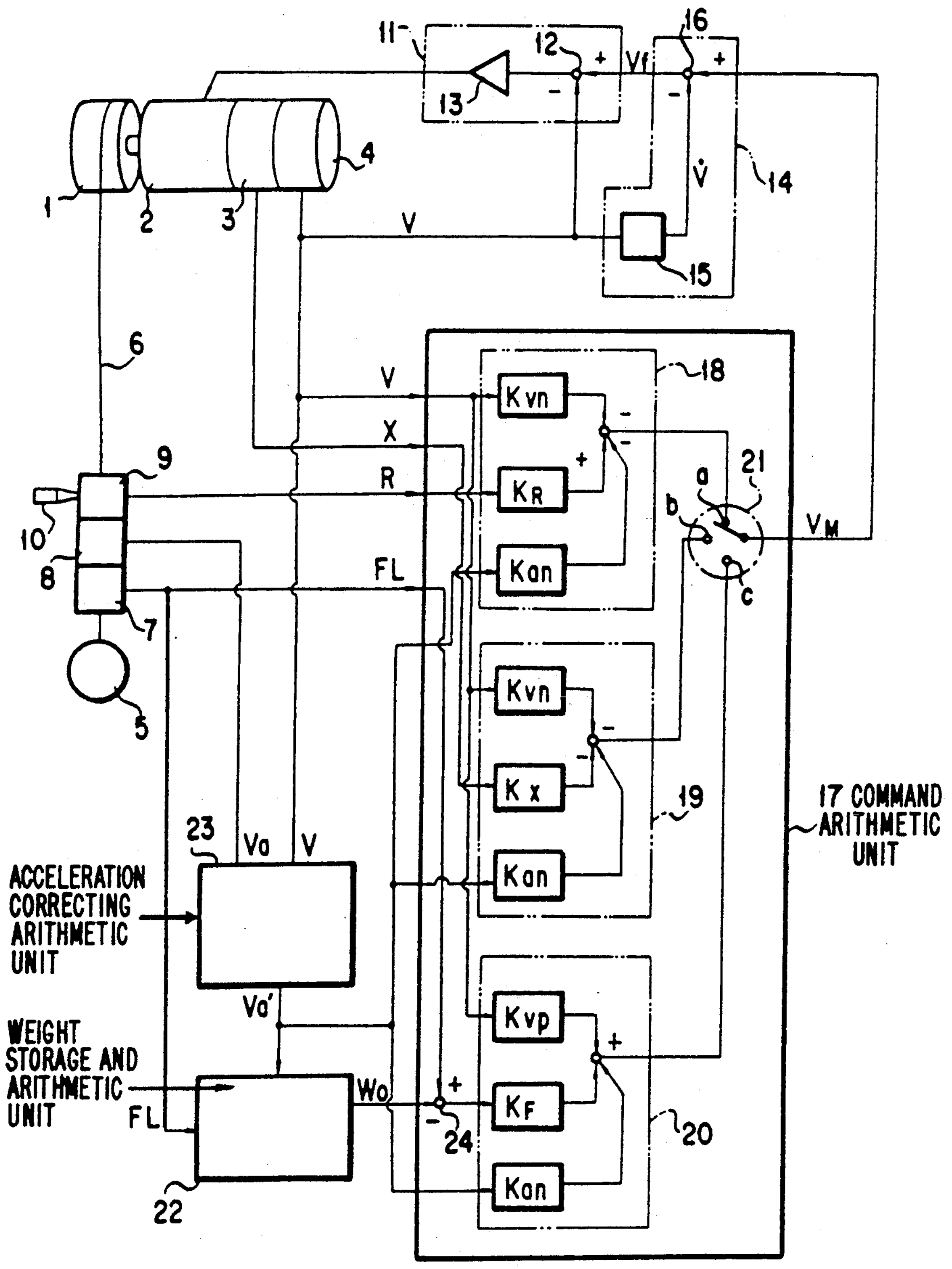
FIG. 2 is a schematic, overall circuit configurational view of an embodiment of the present invention.

FIG. 2 is a schematic, overall circuit configurational view for explaining the basic principle of one embodiment of the present invention. In the drawing, reference numeral 1 denotes a drum adapted to be rotatively driven by an electric motor 2, 3 a position detector for detecting the rotary position of the motor 2, and 4 a speed detector for detecting the rotational speed of the motor 2. Reference numeral 5 denotes a work or cargo arranged to be lifted by a rope 6 which is wound round the drum 1. The rope 6 for hanging the work 5 has a load detector 7, an acceleration detector 8, and a speed command instructing unit 9 attached thereto. Reference numeral 10 denotes an operating lever of the speed commanding unit 9.

The speed command instructing unit 9 is adapted to output a speed command signal R in accordance with the amount of manipulation of the operating lever 10. Further, the acceleration detector 8 is adapted to detect the acceleration of the work 5 and output an acceleration signal Va, and the load detector 7 is adapted to detect the load (or force) applied to the work 5 and output a signal $F_L$. Further, the above-mentioned position detector 3 is adapted to output a signal X indicative of the rotational position of the motor 2, and the speed detector 4 is adapted to output a speed signal V. Reference numeral 11 denotes a drive circuit for driving the motor 2. This drive circuit 11 is constituted by an adder 12 to which the deviation between a command value $V_f$ and a motor speed signal V is inputted, and a drive amplifier 13, so that the motor 2 can be driven according to the deviation $V_f - V$.

Reference numeral 14 denotes a motor acceleration feedback circuit which has a differentiator 15 adapted to differentiate the speed signal V outputted by the motor speed detector 4 to find a motor acceleration signal $\dot{V}$, and an adding point 16. The arrangement is made such that the above-mentioned acceleration signal $\dot{V}$ and a speed command value $V_M$ sent out by the command arithmetic unit 17 which will be mentioned later are fed back to the adding point 16, and a command value $V_f$ is outputted therefrom.

The command arithmetic unit 17 comprises a lever mode arithmetic unit 18, a positional mode arithmetic unit 19, and a balanced mode arithmetic unit 20, which are selectively connected by a mode selector circuit 21 with the command value outputting circuit 14. Reference numeral 22 denotes a weight storage and arithmetic unit. Further, reference numeral 23 denotes an acceleration correcting unit which is added to the above-mentioned arrangement as a principal part of the present invention.

Next, the operation of the above-mentioned command arithmetic unit 17 will be described.

(1) Lever Mode

When the operating lever 10 is manipulated by an operator, the speed command signal R outputted by the speed command instructing unit 9 is inputted to the lever mode arithmetic unit 18 of the command arithmetic unit 17. At that time, the speed signal V from the acceleration detector 4 is also inputted to the lever mode arithmetic unit 18 for stabilizing the raising and lowering operations of the work.

In the lever mode arithmetic unit 18, the speed command signal R is multiplied by a gain $K_R$, and the result obtained is inputted via the adding point 16 to the drive circuit 11 of the motor 2. At that time, the speed signal V of the motor 2 is multiplied by a gain Kvn, and the value obtained is fed back to the adding point in the arithmetic unit 18, and then inputted to the drive circuit 11. As a result, the command value $V_f$ is stabilized.

Further, this lever mode is prior to the other modes. If the mode selection circuit 21 receives as an input thereof the amount of manipulation of the lever 10, it is compulsorily changed over to a lever mode position "a".

(2) Positional Mode

Immediately after the operating lever 10 is stopped and the transmission of the speed command signal R by the operating lever 10 is interrupted, that is to say, when the relationship |R| threshold value Ro has been met, the mode selection circuit 21 is changed over to a positional mode position "b", thus beginning the positional mode. And, at the same time, the load storage and arithmetic unit 22 will also begin its operation.

If the operating lever 10 is not operated by the operator even after the lapse of storage time $T_M$ from the time of commencement of the positional mode, the following relationship is established, thereby maintaining the mode selection circuit 21 at the positional mode.

$$|\text{load signal } F_L - \text{stored value of weight Wo}| \leqq \text{threshold value Fo}$$

Further, if the accuracy of the stored value of weight Wo is within the threshold value Fo, then the selection circuit 21 is maintained in the positional mode without being changed over to the balancing mode so that the work is kept stationary. Further, the threshold values Ro and Fo are preset.

In the above-mentioned positional mode, feedback of the position of the work 5 is carried out to keep the work stationary, the deviation of the motor position signal X at the instant the circuit is changed over to the positional mode from the reference position Xo of the motor, that is, the value X − Xo is multiplied by Kx, and then, the value obtained is negatively fed back to the adding point in the positional mode arithmetic unit 19. The motor speed signal V for stabilization purposes is multiplied by the gain Kvn, and the value obtained is negatively fed back to the adding point in the positional mode arithmetic unit 19.

(3) Balanced Mode

The mode selection circuit 21 is changed over to a balanced mode after the lapse of time $T_M$ (seconds) due to the fact that it is changed over to the positional mode and when the absolute value $|F_L - Wo|$ of the operating force exerted on the work 5 becomes larger than the threshold value Fo.

At an adding point 24, the detected value $F_L$ from the load detector 7 is compared with the command weight value Wo from the weight storage and arithmetic unit 22, and the deviation obtained $(Wo - F_L)$ is multiplied by a predetermined gain $K_F$. Further, for stabilization purposes, the motor speed signal V is multiplied by the gain Kvp and positively fed back to the adding point in the balanced mode arithmetic unit 20, and the result obtained is inputted by the mode selection circuit 21 to the adder 16 of the acceleration feedback circuit 14.

The weight W of the work 5 which is kept stationary is stored in the above-mentioned weight storage and arithmetic unit 22.

If the upward operating force (load) F is applied by the operator to the work 5 which is stationary, then the value $F_L$ from the load detector 7 which is detected at that time, is inputted to the adding point 24. At the adding point 24 the command weight value Wo outputted by the weight storage and arithmetic unit 22 is compared with the above-mentioned detected value $F_L$. The resultant deviation is multiplied by a gain $K_F$ for amplification purposes. In connection with the operating force signal at that time, the value obtained by multiplying the motor speed signal V by the gain Kvp is positively fed back to the adding point in the balanced mode arithmetic unit 20, and then inputted to the speed feedback circuit 14. Since, in this case, the detected value $F_L$ from the load detector 7 is reduced by the upward operating force (F), the deviation $Wo - (W - F)$ which is outputted by the adding point 24 becomes larger than the deviation $Wo - W$ when the work is stationary by the amount of operating force F, thereby increasing the motor torque and moving the work 5 upward. That is to say, upon commencement of application of force on the work in balanced condition, if only the operating force F is sensed by the load detector 7, a deviation which moves the work up or down is created at the adding point 24, so that if the gain constant $K_F$ is set at a sufficiently large value the operator can move the work 5 up or down, while sensing almost no static friction.

Figure 1:
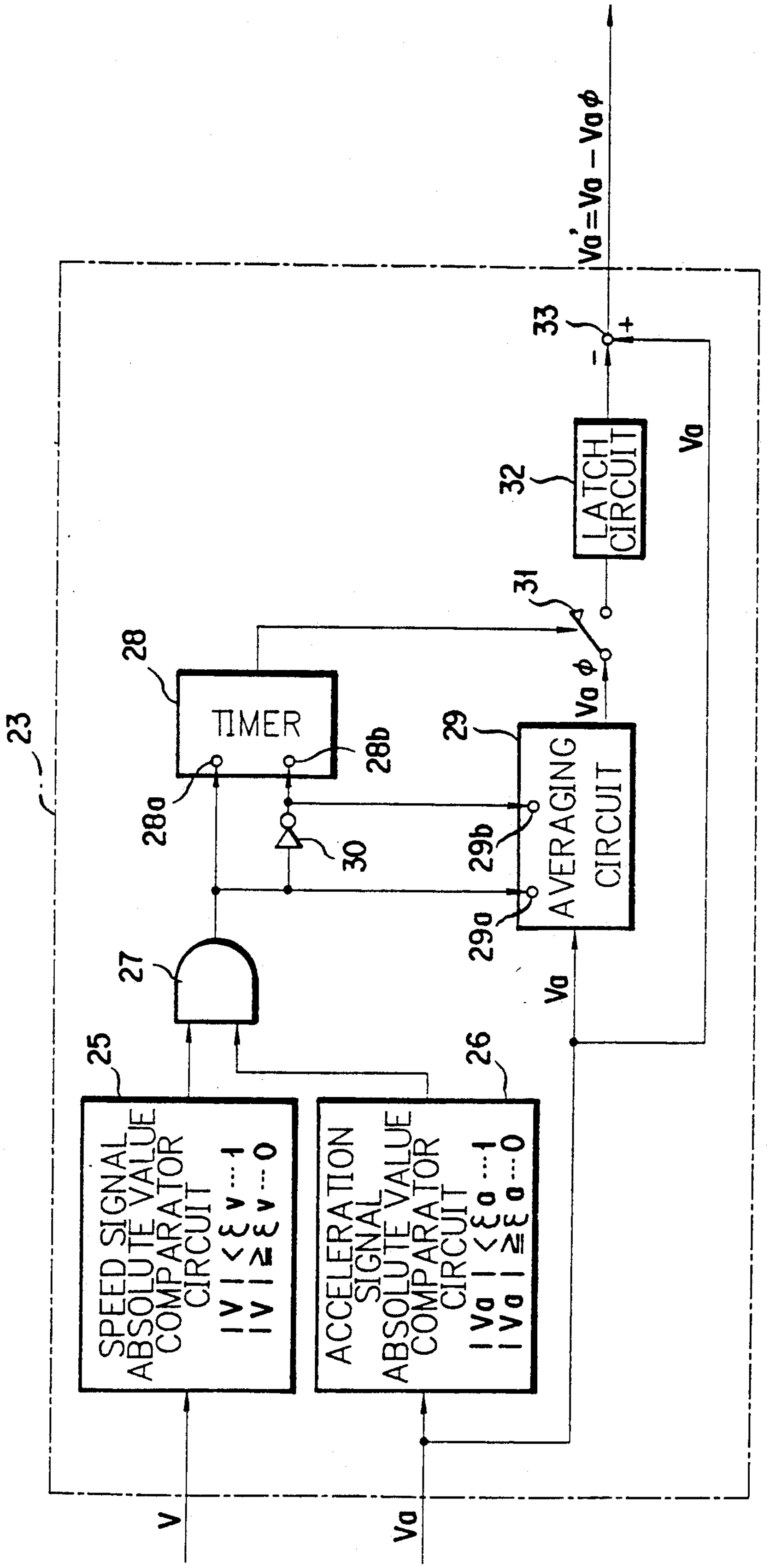
FIG. 1 is a circuit configurational view showing an accleration correcting arithmetic unit which forms a principal part of an embodiment of the present invention.

Next, the arrangement and operation of the acceleration correcting unit 23 which is the principal part of the present invention will be described with reference to FIG. 1.

The speed detector 4 and the acceleration detector 8 are connected with the input side of the acceleration correcting arithmetic unit 23, whilst the command arithmetic unit 17 and the weight storage and arithmetic unit 22 are connected with the output side of the latter.

The motor speed signal V transmitted by the speed detector 4 and the acceleration signal Va transmitted by the acceleration detector 8 are inputted to this acceleration correcting arithmetic unit 23. More specifically, the signals V and Va are inputted to a speed signal absolute value comparator circuit 25 and an acceleration signal absolute value comparator circuit 26, respectively. The speed signal absolute value comparator circuit 25 to which the speed signal V is inputted will output "1" in case of $|V| < \epsilon v$, or otherwise output "0". Further, the acceleration signal absolute value comparator circuit 26 will output "1" in case of $|Va| < \epsilon a$, or otherwise output "0". Further, $\epsilon v$ and $\epsilon a$ are preset values, respectively.

The output values from the above-mentioned speed signal absolute value comparator circuit 25 and acceleration signal absolute value comparator circuit 26 are inputted to an AND circuit 27. The output of AND circuit 27 is inputted to a timer 28 and an averaging circuit 29, respectively. The timer 28 has starting and resetting input terminals 28*a* and 28*b*, respectively, whilst the averaging circuit 29 has starting and resetting input terminals 29*a* and 29*b*, respectively. All of these input terminals are connected with the output side of the AND circuit 27. However, the resetting input terminals 28*b* and 29*b* are connected through an inversion circuit 30 with the above-mentioned AND circuit 27.

The timer 28 is adapted to start in case the output of AND circuit 27 is "1", that is to say, $|V| < \epsilon v$ and $|Va| < \epsilon a$ and output a timer-up signal "1" to a switch 31 after the lapse of $T_1$ seconds. The switch 31 is turned on by the time-up signal "1" inputted thereto.

The averaging circuit 29 is adapted to average the acceleration signals Va and output a averaged acceleration signal $Va\phi$ to the switch 31 while it receives "1" as input thereof at the starting input terminal 29*a*. However, when the averaging circuit 29 receives a resetting signal as input thereof, it will cease averaging function and clear the operation result. The above-mentioned averaged acceleration signal $Va\phi$ is inputted by the switch 31 to a latch circuit 32 where it is to be latched only when a time-up signal "1" is outputted by the timer 28. And then, an adder 33 will compute the difference between the averaged acceleration signal $(Va\phi)$ and the acceleration signal Va $(Va' = Va - Va\phi)$ which is a corrected acceleration signal. This corrected acceleration signal Va' is outputted to the command arithmetic unit 17 and the weight (or load) storage and arithmetic unit 22, respectively.

Since the weight storage and arithmetic unit 22 computes the weight of the work 5 using the command weight value Wo defined by the following formula, the exact weight of the work 5 cannot be detected, if a drift occurs in the acceleration signal Va. However, the exact weight of the work 5 can always be computed by the load storage and arithmetic unit 22 by using the corrected acceleration signal Va' in place of the acceleration signal Va.

$$Wo = \frac{F_L}{1 + Va/g}$$

In the case a negative feedback in the command arithmetic unit 17, the acceleration value $V_M$ is computed using the following equation.

$$V_M = R - Kan \cdot Va - Kvn \cdot V$$

wherein

Kan: negative feedback gain of acceleration

Kvn: negative feedback gain of speed

However, in this case too, if a drift occurs in the acceleration signal Va a stable operation of the load or work cannot be achieved. However, if the corrected acceleration signal Va' is used in place of the acceleration signal Va at each of the lever mode, positional mode and balancing mode arithmetic units 18, 19 and 20, then it become possible to conduct stable load or work raising and lowering operations.

What is claimed is:

1. A controlling apparatus for use in a balanced work handling system comprising:

a work lifting means for raising and lowering a work suspended thereby;

a driver means for driving the work lifting means;

a speed detector means for detecting the rotational speed of the driver means;

a position detector means for detecting the position of said work lifting means;

a load detector means for detecting the loading applied to said work;

a speed command instruction means for outputting a speed command signal in response to the amount of manipulation of an operating lever by an operator;

an acceleration detector means for detecting an acceleration exerted on said work;

a weight storage and arithmetic means for storing and computing a weight of said work in accordance with a signal transmitted by said load detector means;

a command arithmetic unit for computing a command signal which is outputted to said driver means in accordance with an output signal transmitted by each of said speed detector means, said position detector means, said load detector means, said speed command instructing means, said acceleration detector means and the weight storage and arithmetic means, and an acceleration correcting arithmetic means adapted to output a difference between an averaged acceleration signal obtained by averaging drifted acceleration signals transmitted by said acceleration detector means during a predetermined period of time, and said drifted acceleration signal, as a corrected acceleration signal to said command arithmetic means and said weight storage and arithmetic unit, respectively, when the absolute values of the drifted acceleration signal from the acceleration detector means and the drifted speed signal from the speed detector means are less than respective preset values during said predetermined period of time.

2. A controlling apparatus for used in a balanced work handling system as claimed in claim 1, wherein said acceleration correcting arithmetic unit comprises two absolute value comparator circuits adapted to receive as input thereof, a speed signal transmitted by said speed detector means and an acceleration signal transmitted by said acceleration detector means, and compare the speed signal and the acceleration signal with their respective preset values;

an AND circuit adapted to receive as inputs thereof, the output signals from said absolute value comparator circuits;

an averaging circuit adapted to receive as inputs thereof, the output signal from said AND circuit through a starting and resetting input terminal thereof, and said acceleration signal;

a latch circuit adapted to receive as input thereof, an output signal from said averaging circuit and said latch signal;

a switch provided in a line connecting said latch circuit and said averaging circuit;

a timer adapted to receive as input thereof, the output signal from said AND circuit through the starting and resetting input terminals thereof and output ON/OFF actuating signals from said switch; and an adder adapted to compute a difference between the output signal from said latch circuit and said acceleration signal and output it as a corrected acceleration signal to said command arithmetic unit and said load storage and arithmetic means, respectively, 3. A controlling apparatus as for use in a balanced work handling system as claimed in claim 2, wherein the resetting input terminal provided in said averaging circuit and said timer, respectively, are connected by way of an inversion circuit with said AND circuit.

* * * * *